UNITED STATES PATENT OFFICE.

RICHARD BLAIR EARLE AND LUCAS PETRON KYRIAKIDES, OF BOSTON, MASSACHUSETTS, ASSIGNORS TO HOOD RUBBER COMPANY, OF BOSTON, MASSACHUSETTS, A CORPORATION OF MASSACHUSETTS.

PROCESS OF PRODUCING ISOPRENE.

1,106,290.     Specification of Letters Patent.     Patented Aug. 4, 1914.

No Drawing. Application filed November 11, 1911, Serial No. 659,825. Renewed September 25, 1913. Serial No. 791,855.

*To all whom it may concern:*

Be it known that we, RICHARD B. EARLE and LUCAS P. KYRIAKIDES, citizens of the United States, residing at Boston, Massachusetts, have invented certain new and useful Improvements in Processes for Producing Isoprene, of which the following is a specification.

Our invention relates to a new and valuable process for producing isoprene (α) methylbutadiene 1.3; β methyldivinyl) which is a valuable hydrocarbon useful in the preparation of rubber or terpenes.

The new process consists in passing the vapors of methylisopropylketone of the formula:

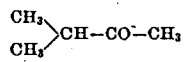

over dehydrating catalysts, such as aluminum silicate, heated to temperatures from 400°–600° C., at pressures less than 60 millimeters of mercury.

In order to illustrate the new process more fully the following example is given. Methylisopropylketone is distilled slowly over aluminum silicate, either powdered or in briquet form, which is kept at a temperature of 550° C. and a pressure of one millimeter of mercury by means of a vacuum pump. The products of the reaction are condensed in suitable receivers by means of refrigerating agents, and purified by fractional distillation. Any unchanged ketone is passed over the catalyst as before.

The fraction boiling from 32°–37° C., consists of isoprene with about ⅕ of its weight of trimethylethylene. The yield of isoprene is about 60% of the theory.

The formation of isoprene takes place by the splitting off of water, according to the equation:

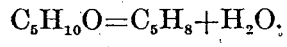

The process is useful at the ordinary pressure but the yield is much increased by carrying out the operation *in vacuo*.

We claim:

1. A process for producing isoprene, which comprises passing the vapors of methylisopropylketone over a heated dehydrating catalytic agent and separating the isoprene formed from the other products.

2. A process of producing isoprene, which comprises passing the vapors of methylisopropylketone over a dehydrating catalyst heated to between 400° and 600° C. and separating the isoprene formed from the other products.

3. A process of producing isoprene, which comprises passing the vapors of methylisopropylketone over heated aluminum silicate and separating the isoprene formed from the other products.

4. A process of producing isoprene which comprises passing the vapors of methylisopropylketone over a heated dehydrating catalyst at less than atmospheric pressure.

5. A process of producing isoprene which comprises passing the vapors of methylisopropylketone over heated aluminum silicate at less than atmospheric pressure.

6. The process for producing isoprene, which consists in passing the vapors of methylisopropylketone,

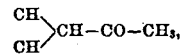

over dehydrating catalyst at temperatures from 400°–600° C., *in vacuo*, at pressures less than 60 millimeters of mercury.

7. The process for producing isoprene, which consists in passing the vapors of methylisopropylketone,

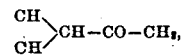

over aluminum silicate at temperatures from 400°–600° C., *in vacuo*, at pressures less than 60 millimeters of mercury.

In testimony whereof, we affix our signatures in presence of two witnesses.

RICHARD BLAIR EARLE.
LUCAS PETRON KYRIAKIDES.

Witnesses:
JESSIE R. MOTT,
M. ALICE HAGARTY.